United States Patent [19]

Sroka et al.

[11] Patent Number: 4,993,723
[45] Date of Patent: Feb. 19, 1991

[54] ELBOW GASKET HAVING MIDDLE AND SIDE SUPPORT SEALING BEADS

[75] Inventors: Michael Sroka, Thalfingen; Peter Grosch, Finningen; Ingo Kremer, Senden, all of Fed. Rep. of Germany

[73] Assignee: Reinz-Dichtungs- Gesellschaft mit beschrankter/Haftung, Neu-Ulm, Fed. Rep. of Germany

[21] Appl. No.: 297,794

[22] Filed: Jan. 13, 1989

[30] Foreign Application Priority Data

Jan. 16, 1988 [DE] Fed. Rep. of Germany ....... 8800475

[51] Int. Cl.$^5$ ............................ F16J 15/06; F16J 15/10
[52] U.S. Cl. ................................ 277/180; 277/207 R; 277/211; 277/235 B
[58] Field of Search ........... 277/235 A, 235 B, 207 R, 277/188 A, 180, 211, 209

[56] References Cited

U.S. PATENT DOCUMENTS

| | | | |
|---|---|---|---|
| 2,058,010 | 10/1936 | Fitch | 277/211 |
| 2,815,549 | 12/1957 | Olson | 277/167.5 X |
| 3,166,332 | 1/1965 | Olson | 277/180 X |
| 3,355,181 | 11/1967 | Olson | 277/180 |
| 4,181,313 | 1/1980 | Hillier et al. | 277/235 B X |
| 4,625,979 | 12/1986 | Inciong | 277/235 B X |
| 4,635,949 | 1/1987 | Lucas et al. | 277/235 B |
| 4,743,421 | 5/1988 | McDowell et al. | 227/207 R X |
| 4,778,189 | 10/1988 | Udagawa | 277/207 R |

Primary Examiner—Allan N. Shoap
Attorney, Agent, or Firm—Robert W. Becker & Associates

[57] ABSTRACT

A flat gasket, especially an intake elbow gasket for an internal combustion engine. The gasket has projecting sealing parts, especially sealing beads, for producing a defined pressure. Those sealing parts that are provided at critical areas of the flat gasket are provided with at least one additional sealing portion, which projects beyond the associated sealing parts.

4 Claims, 1 Drawing Sheet

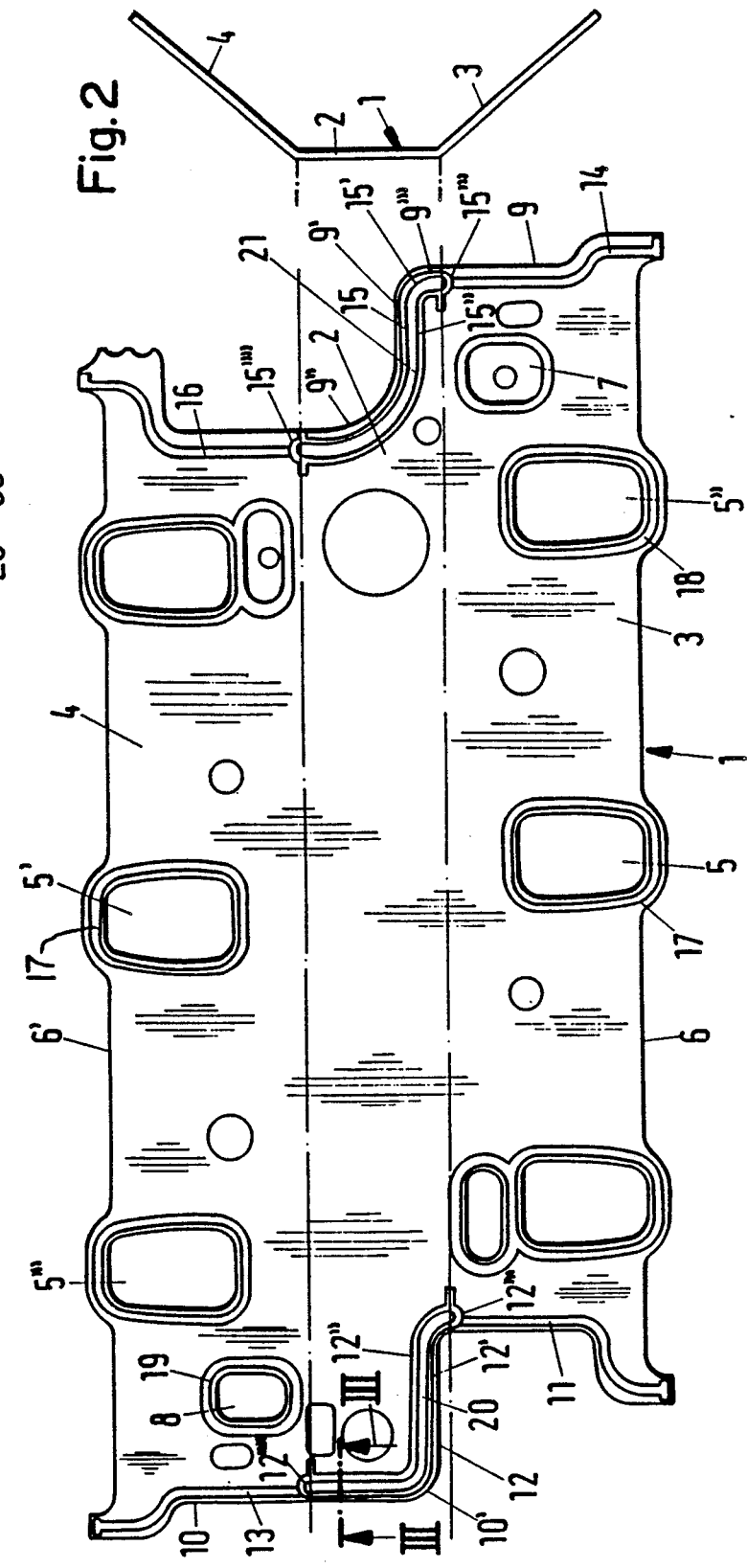

ELBOW GASKET HAVING MIDDLE AND SIDE SUPPORT SEALING BEADS

BACKGROUND OF THE INVENTION

The present invention relates to a flat gasket, in particular an intake elbow gasket for an internal combustion engine, with projecting sealing parts, in particular sealing beads, that are provided for producing a defined pressure.

Known flat gaskets of this general type are used in particular for sealing three and more components that are to be sealed and that abut against one another at right angles, at an acute angle, or at an obtuse angle. In the corner region of the components, the compressibility of this known flat gasket can no longer compensate for the frequently occurring large displacements of components, which displacements occur in unfavorable cases due to the addition of shaping and positional tolerances of the individual components. It has been attempted to compensate for these shaping and positional tolerances by applying a sealing paste prior to assembly of the flat gasket. This measure involves considerable manual work, dosing problems, handling problems with the viscous and tacky sealing paste, and the danger that the sealing paste is smeared on the components. Therefore, such additional measures are unsuitable in mass production.

Flat gaskets are also known, in which sealing beads of elastomeric material were applied to the surface of the gasket to achieve a higher compression displacement. However, in this case, the height of the sealing beads is a few tenths of a millimeter, since with an excessive height, the sealing beads melt at the time of heat treatment and very wide sealing beads have a break in height below the boundary heights in the zenith of curvature.

It is therefore an object of the present invention to construct a flat gasket of this type in such a way that in addition to the necessary basic compressibility for standard sealing, additional compressibility is achieved that is locally many times higher.

BRIEF DESCRIPTION OF THE DRAWINGS

This object, and other objects and advantages of the present invention, will appear more clearly from the following specification in conjunction with the accompanying schematic drawing, in which:

FIG. 1 is a plan view of one exemplary embodiment of the inventive flat gasket with which channels thereof are not yet filled-out with elastomeric material;

FIG. 2 is a simplified end view of the flat gasket of FIG. 1; and

FIG. 3 is an enlarged cross-sectional view of a section of a finished seal with which elastomeric material has been applied in the channel and taken along line III—III of FIG. 1.

SUMMARY OF THE INVENTION

In a flat gasket of the aforementioned general type, the foregoing object is realized pursuant to the present invention by a gasket that is characterized primarily in that at critical points of the flat gasket, the sealing parts are provided with at least one additional sealing portion, which projects beyond the associated sealing parts.

As a result of the construction according to the present invention, at the critical points where the addition of the shaping and positional tolerances of the individual components to be sealed may add up, a sealing section that projects beyond the provided sealing parts may be provided on the flat gasket; with this sealing section, the sealing gaps resulting from differences in tolerance can be compensated for easily. The sealing section increases the basic compressibility of the flat gasket or of the sealing parts many times, so that the compression displacements necessary for compensating for sealing gaps can be achieved in a simple manner. As a result of the high compression displacements achieved by the sealing section, the flat gasket according to the invention is particularly suitable for use in internal combustion engines as an intake elbow gasket. In this case, a central intake elbow is clamped in the manner of a wedge between the cylinder heads of the two rows of cylinders of the internal combustion engine. In so doing, at the inclined flange surfaces of the cylinder heads, combustion air intake channels and cooling water passages of both rows or cylinders must be sealed. Depending upon component tolerances and the installed position of the intake elbow, a horizontal gap of 0.2 to 1.7 mm that has to be compensated for results between a crank case cover and an intake elbow. The location that is to be sealed is found at this location, which has to be sealed against sprayed oil, oil mist and blow-by gases from the camshaft/tappet region. However, the gasket of the present invention is also suitable wherever large, tolerance-related displacements at the abutment corners of several assembled components can no longer be compensated for by the compression behavior of a conventional gasket.

Further specific features of the present invention will be described in detail subsequently.

DESCRIPTION OF PREFERRED EMBODIMENTS

Referring now to the drawing in detail, the flat gasket 1 illustrated in the embodiment of FIG. 1 is used in particular for sealing three or more components that abut against one another at right angles, at an acute angle, or at an obtuse angle. Increased requirements are made of the compressibility of the gasket at the corner regions of components that abut against one another.

The flat gasket 1 consists of a soft material, and is thin. As shown in FIG. 2, the flat gasket is constructed in an angular manner in cross-section for the purpose of sealing abutting components. In the illustrated embodiment, the gasket comprises a central, narrower, flat intermediate section 2 and side parts 3 and 4 that from the intermediate section are directed outwards away from one another at approximately the same obtuse angle. The side parts 3 and 4 are preferably of the same length. As shown in FIG. 1, the side parts 3, 4 have openings 5, 5' of approximately rectangular cross-section that extend from the edges 6 and 6' of the side parts 3, 4 perpendicularly in the direction of the intermediate section 2. These openings 5, 5' are located in the region of the combustion air intake ports, since the gasket illustrated is preferably used in internal combustion engines as an intake elbow gasket.

In addition to the openings 5, 5', openings 7 and 8 are provided in the side part 3 and in the side part 4 in the region of the cooling channels of the internal combustion engine. The openings 7 and 8 are disposed approximately diagonally opposite one another and adjacent to the intermediate section 2. These openings also have a rectangular contour and extend transverse to the longitudinal direction of the flat gasket 1. The openings 7 and 8 are smaller than the openings 5, 5' and are spaced not only from an adjacent opening 5" or 5'" (likewise provided in the region of the intake port) but also from the adjacent end face 9 or 10 of the flat gasket 1.

In order to increase the basic compressibility of the flat gasket 1, sealing beads 11 to 16 of an elastomeric material are applied to the surface of the gasket by the screen printing method. The sealing beads may be provided on either one side or on both sides. Sealing beads 17 to 19 are also provided along the edges of the openings 5, 5', 5", 5'".

In regions where additional compressibility of the flat gasket 1 is required, the sealing beads are disposed in such a way that they define a channel-like chamber 20, 21. The sealing beads 12 and 15 are provided in such critical regions and are constructed accordingly. The sealing beads 12 and 15 comprise bead sections 12' and 12" or 15' and 15" that in each case are parallel to one another and are interconnected via end sections 12'" and 12"" or 15'" and 15"" that are rounded off in the form of partial circles. The sealing beads 12, 15 extend over the entire width of the intermediate section 2 of the flat gasket 1, with their curved end sections 12'", 12""and 15'", 15"" projecting into the side parts 3 or 4. The respective outer bead sections 12' and 15' extend directly adjacent to the edge sections 10'. and 9' of the intermediate section 2, with the edge section 10' being constructed in the form of a shoulder with a rounded edge, whereas the edge section 9' includes a section 9" that is curved in the shape of a partial circle which adjoins the eide part 4 and merges via a shoulder 9'" into the other side part 3. The adjacent sealing beads 12 and 15 also have a corresponding shape. The channels 20 and 21 formed between the bead sections 12' and 12" and 15' and 15" are filled with a resilient, epoxy foamed material 33 (FIG. 3). The elastomeric material 33 forms a bulge that projects beyond the sealing beads 12, 15. The sealing beads 11 to 16 and 17 to 19 are applied in a first printing process, whereas the channels 20, 21 of the sealing beads 12, 15 are filled in the form of a bulge in a further operation. Due to the use of the elastomeric material 33 in the sealing beads 12, 15, which material foams during cross-linking or polymerization, the thickness of the sealing beads can be adjusted such that the required compression displacements can be accurately set.

The sealing beads, and the elastomeric mass that is preferably produced from the same material, do not have to be foamed, but may be applied from any suitable material pursuant to any suitable method. The elastomeric masses 33 compensate for greater irregularities between two cooperating sealing surfaces (not shown) by substantially increasing the thickness of the sealing beads, thus ensuring an adaptation to the necessary compression displacement. Thus, by disposing the elastomeric mass 33 in the channels 20. 21 of the sealing beads 12, 15, in addition to obtaining the necessary basic compressibility for the standard sealing of the flat gasket 1, an additional compressibility that is locally many times higher is achieved for compensating for a sealing gap which results from the addition of shaping and positional tolerances of the individual components that are to be sealed.

The present invention is, of course, in no way restricted to the specific disclosure of the specification and drawing, but also encompasses any modifications within the scope of the appended claims.

What we claim is:

1. A gasket comprising a plate of thin base material, said plate having a substantially rectangular-shaped middle segment and opposite side parts each on an opposing side of the middle segment along a length thereof and oriented offset at an angle to the middle segment, first and second sealing bead means of elastomeric material arranged upon said base material and extending on said middle segment from one side part to the other, said first and second sealing bead means being spaced apart so that a sealed region is defined therebetween on said middle segment, each bead means comprising a middle sealing strip and two lateral side support sealing strips adjoining said middle sealing strip and having a substantially smaller height than said middle sealing strip, said two lateral side support sealing strips being interconnected at the ends of each sealing bead means on said side parts by rounded-off sections of elastomeric material so that said middle sealing bead is enclosed about its entire perimeter.

2. A gasket according to claim 1, characterized thereby that the middle sealing strip and the two lateral side support sealing strips consist of the same material.

3. A gasket according to claim 1, characterized thereby that the elastomeric material is a foamable epoxide which in the foamed condition forms the middle sealing strip.

4. A gasket according to claim 1, in which said elastomeric material is selected from the group consisting of foamed and unfoamed elastomeric material.

* * * * *